Figure 1:
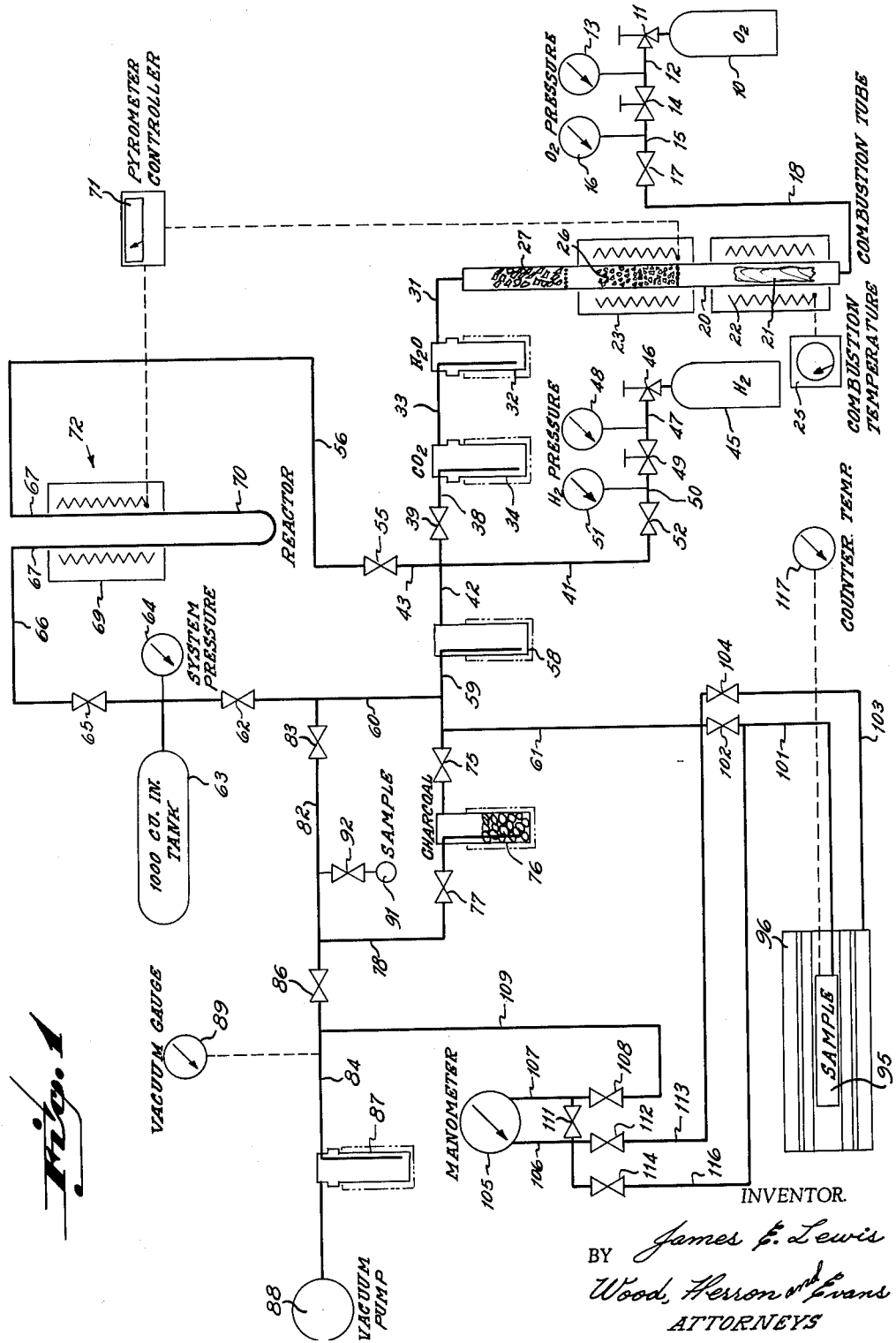

Dec. 28, 1965   J. E. LEWIS   3,226,197
METHOD AND APPARATUS FOR DETERMINING $C_{14}$
Filed July 13, 1962   2 Sheets-Sheet 2

INVENTOR.
BY James E. Lewis
Wood, Herron and Evans
ATTORNEYS

United States Patent Office 3,226,197
Patented Dec. 28, 1965

3,226,197
METHOD AND APPARATUS FOR
DETERMINING $C_{14}$
James E. Lewis, Louisville, Ky., assignor, by mesne assignments, to The Martin Sweets Company, Inc., Louisville, Ky., a corporation of Kentucky
Filed July 13, 1962, Ser. No. 209,708
19 Claims. (Cl. 23—230)

This invention primarily relates to a method and apparatus for measurement of the radioactive carbon content of carbon containing samples. More particularly, in main aspect the invention relates to apparatus for radioactive dating, whereby the approximate age of a carbon containing sample may be determined by measurement of its $C_{14}$ content. In a related aspect, the invention relates to a method and apparatus for measuring the tritium content of hydrogen containing materials.

The principle of radioactive dating is based upon the fact that the $C_{14}$ isotope is produced in the atmosphere by cosmic ray bombardment of atmospheric nitrogen. As carbon dioxide, the $C_{14}$ atoms are mixed in the atmosphere with the ordinary, non-radioactive isotope of carbon, $C_{12}$, and are thereby incorporated into the life cycle. Prior to variations caused by the combustion of carbonaceous fuels, and more recently, variations resulting from atomic explosions, the $C_{14}$ content in the atmosphere was in equilibrium with the $C_{12}$ content, and in living organic matter the $C_{14}$ content was proportional to the $C_{14}$ content of the atmosphere.

The $C_{14}$ isotope of carbon is a weak beta emitter and slowly decays to nitrogen 14. In a living organic system, wherein atmospheric carbon dioxide is constantly being absorbed, the $C_{14}/C_{12}$ ratio is a constant, as it is in the atmosphere, but when the living matter dies and ceases to receive carbon from its environment, the initial $C_{14}/C_{12}$ ratio ceases to be maintained and the $C_{14}$ content gradually diminishes by radioactive decay. Because the decay of $C_{14}$ follows a strict mathematical relation with time, the half life of $C_{14}$ being approximately 5568 years, measurement of the $C_{14}/C_{12}$ ratio of a given carbon containing sample can under certain conditions provide a measure of the period of time which has elapsed since the sample ceased exchanging carbon with its environment.

In addition, the $C_{14}$ content of certain materials, including inorganic materials, may in some instances be taken to indicate various facts relating to the material, for example, its origin, environmental geologic conditions, contamination, and the like. This invention is also of utility for determination of the $C_{14}$ content of samples for purposes other than dating, although at the present time dating is probably its most important single use.

The first $C_{14}$ measuring techniques were based upon the conversion of the carbon containing sample to carbon black, which was then introduced into a radioactivity counter, whereby the $C_{14}$ content of the sample was measured. Several difficulties attended the use of this method, and the technique has now largely been abandoned.

More recent techniques have been based upon the conversion of the carbon content of the sample to a gaseous material. In such techniques the carbon is first converted to carbon dioxide, at least as the initial step. In general, however, carbon dioxide itself is not suitable as a "counting gas" for introduction into proportional gas counters unless it is extremely pure, particularly in regard to electro-negative contaminants such as nitrogen and the halogens. Electro-negative impurities even in the range of a few parts per billion cause loss of the counting plateau and spurious counts.

Other methods have involved the conversion of carbon dioxide to acetylene or ethane, but the difficult nature of such conversions makes those systems relatively difficult to employ.

The $C_{14}$ measuring system of this invention is based upon a technique wherein a combustible sample is burned to form $CO_2$, and wherein other samples are acidified or wet ashed to form $CO_2$, and the $CO_2$ is then converted to methane. Methane possesses several advantages as the counting medium: counters using methane as the counting gas are not so sensitive to gaseous impurities as counters which utilize $CO_2$, and in addition methane is relatively easy to synthesize from $CO_2$.

In any $C_{14}$ measuring or dating system there are several potential sources of error. Since the $C_{14}$ content is determined by measuring the radioactivity of the sample, any impurities in the sample which are radioactive will introduce error into the count and age calculations. Therefore, the process of preparing the counting gas must involve an absolute minimum of contact with materials which might introduce radioactive contaminants. Thus, the conversion of the sample into the counting gas must be conducted in a closed system, isolated from atmospheric $CO_2$, which itself contains $C_{14}$. Another possible source of radioactive contamination is radon gas, and the reagents used for the conversion of the sample to $CO_2$ must be such as to minimize the possibility of introducing radon into the system. Still another detrimental contaminant is sulfur dioxide and other sulfur containing impurities, which poison the catalyst used in the conversion of the $CO_2$ to methane.

Once the $CO_2$ sample has been produced, its subsequent handling and conversion must be such as to eliminate any possible isotopic separation between the $C_{14}$ containing molecules and the $C_{12}$ containing molecules. The conversion of the $CO_2$ to methane must be quantitatively complete, else different reaction rates for $C_{14}$ and $C_{12}$ containing molecules may alter the $C_{12}/C_{14}$ ratio of the methane product. Also, physical separation of the carbon containing gases from other admixed gases or impurities must be quantitative, or fractional separation may occur wherein the $C_{12}/C_{14}$ ratio is changed.

Briefly put, in the apparatus I have invented for $C_{14}$ measurement, a carbon containing combustible sample is burned in a closed, heated combustion tube. The combustion products are passed over a bed of cupric oxide, which I use to insure complete oxidation of all of the carbon to $CO_2$, and to oxidize any CO which may be present. Following contact with the CuO, the products of combustion are passed through a filter which removes sulfur containing impurities and nitrogen and a part of the water vapor content of the products of combustion. The filter I have invented for this purpose comprises a mixture of manganese dioxide, preferably in highly divided form, and granular silica gel, which not only serves to remove the contaminants but also holds a slight back pressure on the combustion zone, insuring more complete combustion and consumption of oxygen.

Non-combustible samples, or samples which it is not desirable to burn, are treated in a conventional manner by acidification or wet ashing techniques to convert their carbon content to $CO_2$.

The $CO_2$ is then introduced into a first cold trap cooled with Dry Ice, wherein remaining water vapor and other higher condensibles produced by combustion are quantitatively removed. From the first cold trap, the gas mixture flows into a second cold trap which is cooled with liquid nitrogen, wherein the $CO_2$ is solidified and thereby separated from excess oxygen, which is taken off through a vacuum pump. When all of the $CO_2$ has been captured in the second trap, the $CO_2$ is distilled into a third trap which is also cooled with $N_2$. I have found that this distillation process removes occluded oxygen which may be retained with the solidified $CO_2$ in the second trap.

Alternatively, where the impurity content of the sample is suspected to be undesirably high, the sample may be redistilled from the second trap back to the first trap to insure complete removal of sulfurous and other higher condensibles, and then distilled to the third trap. From the third trap, the carbon dioxide is introduced into an evacuated tank which is charged with dead hydrogen under pressure in sufficient quantity for complete conversion of the $CO_2$ to methane.

Conversion of the $CO_2$ to methane is preferably effected in a special reactor wherein the $CO_2$–$H_2$ mixture is contacted a number of times with a ruthenium catalyst at a temperature in the 400–550° C. range. During each pass over the catalyst, at least a portion of the $CO_2$ is converted to methane, and water vapor is formed. I have found that the reaction will consistently go to completion quantitatively in a short period of time if the water vapor which is produced in each pass over the catalyst is immediately thereafter removed by passing the gases through a water removal zone, which is either chilled to a temperature below the freezing point of water or contains a water absorbing medium.

Following complete conversion of the sample to methane, excess hydrogen is removed by passing the mixture through two traps in series comprising the previously mentioned third trap, which is cooled with liquid nitrogen and which freezes out part of the methane, and a fourth trap which is cooled with liquid $N_2$ and which contains activated charcoal and absorbs the remainder of the methane. The excess hydrogen flows through the third and fourth traps and is taken off through the vacuum system. The methane is then distilled by alternately heating and cooling the third and fourth traps and is admitted into a sample counter, for radioactive measurement of its $C_{14}$ content.

As previously suggested, in another aspect this invention relates to a method and apparatus for measuring tritium. Tritium is the $H_3$ isotope of hydrogen, and is a weak beta emitter, as is $C_{14}$.

Tritium is used as a radioactive tracer in certain techniques; for example, tritium-containing water may be used to trace the course of underground streams. In such determinations, it is necessary to measure the tritium content of various hydrogen containing samples.

The apparatus I have invented for measuring $C_{14}$ may be used to measure tritium by reducing the hydrogen- and tritium-containing sample and then converting the gaseous $H_2$-tritium mixture to $CH_4$, which is used as the counting gas. If the sample is aqueous, the reduction may be effected by reducing the $H_2O$ with metallic zinc or magnesium. The hydrogen is converted to methane and purified by the same technique as that by which $C_{14}$ samples are converted to $CH_4$.

Figure 2:
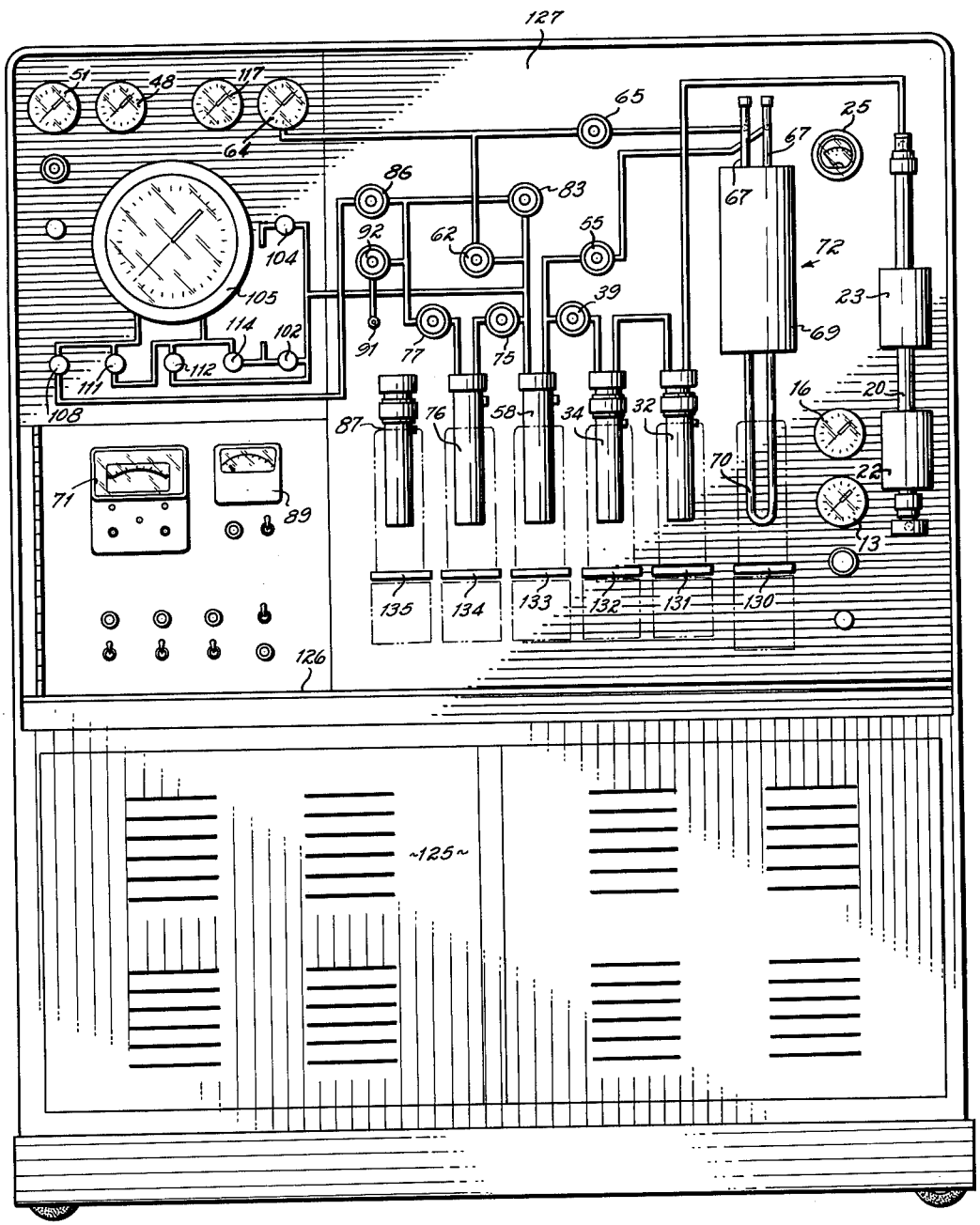

The system of this invention may best be further described by reference to the accompanying drawings, in which:

FIG. 1 is a diagrammatic view of preferred $C_{14}$ measuring apparatus embodying the principles of the invention, and FIG. 2 is a vertical plan of a console housing the apparatus illustrated in FIG. 1.

With reference to FIG. 1, essentially pure, radioactively dead oxygen for the combustion of a carbon containing combustible sample which is to be dated is supplied from a tank 10. Tank 10 has a shut-off valve 11 and is connected to a line 12, the pressure in which is measured by a high pressure gauge 13, reading for example from 0–3000 p.s.i. Line 12 is connected through a throttling or pressure reducing valve 14 to a line 15. Line 15 has a low pressure indicator 16 (e.g. 0–100 p.s.i.) connected to it, which measures the pressure of the gas after passing through pressure reducing valve 14. Line 15 is connected through a vacuum valve 17 which controls flow rate to a line 18. It will be understood that the elements 10–17 thus comprise a system for delivering oxygen at a low, regulated pressure and flow rate.

Line 18 is connected to one end of a combustion tube which is designated generally as 20. The combustion tube 20 comprises an elongated chamber in which the carbon content of the carbon containing sample 21 is converted to carbon dioxide. The sample 21, which may be a piece of wood, cloth, or other combustible material, is supported for combustion in tube 20 by suitable means not shown.

Combustion tube 20 is surrounded by a pair of axially spaced heaters 22 and 23 which are electrically operated. Heater 22 surrounds the section of the tube 20 in which the sample 21 is located, and the second heater 23 is disposed around the tube 20 in the downstream direction from sample 21. Instrumentation 25 is provided to indicate the temperature in tube 20 adjacent sample 21. The electrical circuitry for energizing the resistively operated heaters 22 and 23 and for regulating the current to them may be conventional and is not shown. Within the section of tube 20 which is surrounded by heater 23, there is a porous bed 26 of cupric oxide, which is supported on a screen. In use, this bed 26 is heated to a temperature in the approximate 650–700° C. range by heater 23.

Downstream from the CuO bed 26, tube 20 contains a filter 27 preferably comprising finely divided or powdered manganese dioxide, $MnO_2$, mixed with granular silica gel. I have found this manganese dioxide-silica gel filter to be highly effective for several purposes: it acts as a fluid flow restrictor to hold a small positive pressure on the combustor tube 20, for example about 1 p.s.i., which improves combustion efficiency and promotes 100% consumption of the oxygen. By controlling the weight ratio of powdered $MnO_2$ to the granular silica gel, the back pressure is easily adjusted and is reproducible from run to run. Moreover, the silica gel removes some of the water formed by combustion of the sample, and the manganese dioxide absorbs sulfur compounds that may be present, which if not removed would be detrimental at a later stage in the process. The $MnO_2$ also absorbs a substantial part of any nitrogen which may be present either as an impurity admixed with the oxygen, or released by combustion of the sample.

A line 31 leads from the end of combustion tube 20, downstream of the $MnO_2$ filter 27 therein, to a cold trap 32 in which water vapor admixed with the excess oxygen and $CO_2$ from the combustion system is frozen out and separated quantitatively. In use, this cold trap 32 is chilled to a temperature substantially below the freezing point of water, but above the freezing point of carbon dioxide; preferably the trap 32 is cooled with Dry Ice, having a temperature of about $-78.5°$ C. At this temperature, the water vapor solidifies in the trap, and the $CO_2$ and $O_2$ pass through, so that quantitative removal of the water is achieved. Cold trap 32 may be conventional, and need not be described in detail herein; however, a preferred type of cold trap which is highly effective for this separation is disclosed in my copending application Serial No. 209,629, filed July 13, 1962, and entitled "Cold Trap," to which reference is hereby made.

If the sample is not to be burned, the combustion system is not used. Instead, the sample is converted to $CO_2$ by acidification, for example, to convert carbonate to $CO_2$, or is dry ashed with a strong acid. The $CO_2$ produced by such techniques is introduced into the system upstream of the cold trap 32, and is thereafter handled in the same manner as samples which have been produced by combustion.

From cold trap 32 a line 33 is connected to the inlet of a second cold trap 34. This cold trap 34 may be similar to the cold trap 32, but is chilled to a lower temperature, at which the $CO_2$ will be solidified and thereby separated from admixed $O_2$. This trap 34 is preferably cooled in liquid nitrogen, having a temperature of about $-195.8°$ C. At this temperature the carbon dioxide is quantitatively retained within the cold trap, while oxygen and any other low boiling or elemental gases pass through the trap and are withdrawn from the system. A line 38 is connected to the outlet side of cold trap 34, and this line 38 includes a vacuum valve 39.

Valve 39 is connected to three lines 41, 42 and 43. A supply of radioactively dead hydrogen gas under pressure is connected to line 41. This hydrogen supply may be similar to the oxygen supply previously described, and preferably includes a tank of hydrogen 45 which is connected through a tank shut-off valve 46 to a line 47 the pressure in which is measured by a high pressure meter 48. Line 47 is connected through a throttling valve or pressure reducing valve 49 to a line 50, the pressure in which is measured by a meter 51. Line 50 is connected through a vacuum valve 52 to line 41. This system comprises a preferred system for introducing hydrogen at a regulated pressure and flow rate into line 41.

Line 43 connected to valve 39 is connected through a valve 55 to a line 56. Line 42 is connected to the inlet side of a cold trap 58 which may be substantially similar to the traps 34 and 32. In use, this trap 58 is maintained at a temperature below the temperature at which methane freezes; preferably the trap is cooled by liquid nitrogen. At this temperature a major part of the methane, into which the $CO_2$ is converted, as will be explained, is frozen and retained in the trap. The outlet side of trap 58 is connected to a line 59 which in turn is connected to two lines 60 and 61.

Line 60 is connected through a valve 62 to a reactor ballast or tank 63. The purpose of this tank 63 is to receive the carbon dioxide, which is then mixed with $H_2$ prior to conversion to methane, $CH_4$. A pressure meter 64 indicates the pressure in tank 63. Tank 63 is connected through a valve 65 to a line 66 which in turn is connected to a reactor 72 in which the $CO_2$ is converted to $CH_4$ in accordance with the reaction,

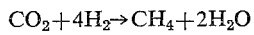

$$CO_2 + 4H_2 \rightarrow CH_4 + 2H_2O$$

The reactor apparatus 72 is fully disclosed in my copending application Serial No. 209,720, filed July 13, 1962, and entitled "Method and Apparatus for Converting Carbon Dioxide." Briefly, however, the preferred apparatus 72 comprises several reaction tubes 67, which each pass through heating means 69 and which are separated from each other by water removal chambers or zones 70. Each reaction tube 67 contains a reaction catalyst, which preferably comprises ruthenium metal supported on an aluminum oxide support. The catalyst may consist of aluminum oxide pellets impregnated with 0.5% by weight ruthenium metal. This catalyst is disposed in the tubes 67 within the heater 69. The water removal sections 70 between the reaction tubes 67 may comprise U-shaped loops which are chilled to a temperature substantially below the freezing point of water, but above the freezing point of carbon dioxide and methane, so that as the gaseous mixture flows through the water removal loops, water formed in the reaction zones will be separated and removed, whereby the reaction takes place quantitatively and all of the $CO_2$ is converted to $CH_4$. Alternatively, the water removal zones 70 may contain a water absorbing medium such as silica gel. One or more water removal zones 70 may be employed; in FIG. 1, one such zone is shown.

The heater 69 may be resistively operated and should be capable of maintaining a temperature of about 400–550° C. in the reaction tubes 67, at which the reaction takes place most rapidly. The electric circuitry and variable resistance means for controlling the current supplied to the heater 69 are not illustrated. The temperature maintained by the heater 69 may be automatically controlled as by means of a pyrometer controller which is shown diagrammatically at 71. The pyrometer controller 71 may be also connected to regulate the temperature within combustor heater 23.

Line 56 is connected to the outlet of the conversion reactor 72. Line 59 is connected through a valve 75 to the inlet of a cold trap 76 which in use is maintained at about the temperature of liquid nitrogen, and which preferably contains activated charcoal. The purpose of this cold trap 76 is to quantitatively separate any methane which was not previously separated in trap 58. The outlet side of trap 76 is connected through a valve 77 to a line 78.

A line 82 which includes a valve 83 is connected between line 78 and line 60. A line 84 is connected from line 78 through a valve 86 to the inlet side of a cold trap 87. The outlet side of cold trap 87 is connected to the intake of a vacuum pump indicated diagrammatically at 88. Pump 88 may suitably be a force pump combined with a high vacuum pump of the oil or mercury diffusion type. In use this cold trap 87 is cooled with liquid nitrogen, and prevents all gases having freezing points substantially above that of liquid nitrogen from entering and possibly contaminating the pump 88. The pressure of gas in line 84 between valve 86 and cold trap 87 is measured by a vacuum gauge 89.

Line 82 leads to a sample outlet coupling 91 through a valve 92, between valves 86 and 83, and through this coupling 91 the gaseous sample may be removed from the system for storage or further treatment.

The low energy beta-ray activity of the sample is measured by a proportional sample counter which is indicated diagrammatically at 95. The sample counter 95 is mounted inside an anti-coincidence umbrella 96 which surrounds it and which counts external or spurious radiation, such as cosmic radiation, which otherwise would introduce errors in the count of beta-ray emission of the sample as measured by the sample counter. Radioactivity measuring devices suitable for use in $C_{14}$ determining techniques, tritium determinations, and related methods of this general type are well known and do not of themselves comprise a part of this invention.

The sample counter 95 is connected to line 61 by a line 101 which includes a valve 102. The anti-coincidence umbrella 96 is also connected to line 61, by a line 103 which includes a valve 104. The absolute pressure of the gas in the sample counter 95 and the anti-coincidence counter 96 is very accurately measured by a manometer 105 which has a pressure inlet line 106. A line 107 of manometer 105 is connected to vacuum, so as to measure the absolute pressure in line 106, through a valve 108 in a line 109, to vacuum line 84. Lines 106 and 107 are connected through a valve 111. Pressure inlet line 106 is connected through a valve 112 and a line 113 to line 61. Pressure inlet line 106 is also connected through a valve 114 and a line 116 to line 101. Separate readings of the absolute pressure in the sample counter 95 and the anti-coincidence counter 96 while the system is in operation may be measured by opening either valve 114 or 112 respectively and closing the other valve. The temperature of the gas in sample counter 95 is measured by a meter 117.

The counters 95 and 96 may be connected through filter networks and pre-amplifiers to scaling and counting electronics, so that a direct reading of counts is indicated. These do not comprise a part of this invention, and need not be described.

FIG. 2 illustrates a vertical plan view of a console in which are mounted the several elements of the overall system shown in FIG. 1. The console comprises a preferred arrangement of the system for commercial installation.

The console shown in FIG. 2 includes a lower cabinet 125 having a horizontal shelf 126 and a cabinet 127 above shelf 126. On the front of cabinet 127 the various pressure and temperature gauges, cold traps, valves, combustion tube and conversion reactor are mounted for convenient reading, access and removal. Corresponding elements bear the same numbers in FIG. 2 as in FIG. 1.

The combustion tube 20 is mounted in vertical position on the right side of the front of cabinet 127. The conversion reactor 72 is mounted beside combustion tube 20. The cold traps 32, 34, 58, 76 and 87 are mounted side by side, above supports 131, 132, 133, 134 and 135 respectively. These supports 131–135 are hinged to the front of cabinet 127 to swing about a horizontal transverse axis into locked extended horizontal position to hold Dewar flasks, shown in outline, around the cold traps. The Dewar flasks are filled with liquid $N_2$ or Dry Ice to cool the cold traps, as previously explained. A support 130 is also provided to support a Dewar flask around the water removal loop 70 of the conversion reactor 72. On the front of the panel of cabinet 127 lines corresponding to the various pneumatic lines of the apparatus are drawn or printed, as indicated by the dark lines shown. These lines show the connections of the valves and other elements which are mounted in the front panel of the cabinet. On the left side of the panel the hydrogen pressure indicators 48 and 51, the counter temperature meter 117 and the pressure indicator 64 are mounted. The manometer 105 is also located on the left of the cabinet, as are the pyrometer controller 71, the vacuum gauge 89, and the various electrical controls.

OPERATION OF THE SYSTEM FOR ANALYSING $C_{14}$

In determining the $C_{14}$ content of a combustible carbon containing sample, the sample 21 is placed in the combustion tube 20 within heater 22 as indicated in FIG. 1. Since the $C_{14}/C_{12}$ ratio of the $CO_2$ would be altered by the admission of atmospheric $CO_2$, combustion must take place in an isolated system, and to this end the apparatus is flushed with oxygen from tank 10 and then evacuated by vacuum pump 88. The sample is burned in the oxygen by energizing the heaters 22 and 23. The combustion of the sample in heater 22 may not be complete, that is, some of the carbon may be incompletely oxidized to form CO. However, the cupric oxide 26 in tube 20, which is maintained by heater 23 at a temperature of about 650–700° C., will convert any carbon monoxide present to $CO_2$, in accordance with the reaction,

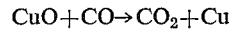

$$CuO + CO \rightarrow CO_2 + Cu$$

The resulting elemental copper is then reoxidized at the elevated temperature present to reform cupric oxide:

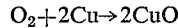

$$O_2 + 2Cu \rightarrow 2CuO$$

As the gaseous mixture of $CO_2$, water vapor, and excess $O_2$ passes through the manganese dioxide-silica gel filter 27 in tube 20, the silica gel removes by absorption a substantial part of the water vapor. In addition, the manganese dioxide has been found effective to absorb sulfurous impurities, particularly sulfur dioxide $SO_2$, which may be produced or released by the combustion of certain types of samples. It is critical that the carbon dioxide be completely free of sulfur containing contaminants, because sulfur even in a few parts per million poisons the ruthenium catalyst whereby the $CO_2$ is converted to $CH_4$. In this regard, the filter of highly powdered $MnO_2$ appears to achieve substantially better results in $SO_2$ removal than a filter of granular or larger sized $MnO_2$. Also, the manganese dioxide absorbs at least in part any nitrogen impurities which may be present, which tend in concentration to affect the counting characteristics of methane which is subsequently produced and used in the sample counter. Filter 27 and valve 39 hold a low back pressure in the combustor, which may be adjusted in respect to flow rate to cause almost complete consumption of the $O_2$.

The first cold trap into which the gas mixture flows, trap 32, is cooled with Dry Ice. At the temperature maintained by Dry Ice the cold trap freezes any remaining water vapor, and the $CO_2$ and $O_2$ pass on through it. Thus, cold trap 32 comprises a quantitative water removal system.

From cold trap 32, the mixture flows to trap 34, which is cooled with liquid nitrogen to a temperature of about −196° C. In this cold trap the carbon dioxide content of the mixture is quantitatively frozen out, and is thereby separated from excess oxygen, which is taken off by the vacuum pump 88 through valve 39, cold trap 58, lines 59 and 60, valve 83, line 82, valve 86, line 84, and trap 87. The remainder of the system is evacuated.

Some oxygen may be trapped or occluded in trap 34, particularly if the oxygen was in substantial excess or if flow rate was relatively high through the trap. To remove such oxygen, the contents of trap 34 are distilled into trap 58 by warming trap 34. Due to the low flow rate during distillation, there is little tendency for the oxygen to again be trapped, and the oxygen is taken off through the vacuum line and the $CO_2$ quantitatively retained in trap 58.

Alternately, if it is suspected that the sample in trap 34 may still contain sulfurous impurities, it is desirable to utilize an additional purifying or separation step to remove such impurities. This is done by exchanging the cryogens on traps 34 and 32, so that trap 32 is at the temperature of liquid $N_2$ and trap 34 at the temperature of Dry Ice. Under these conditions, valve 39 being closed, the $CO_2$ in trap 34 redistills into trap 32, while sulfurous impurities remain in trap 34. Upon opening valve 39, and warming trap 32, the $CO_2$ is distilled from trap 32 through trap 34 to trap 58, remaining $O_2$ is separated in the process, and the sulfurous impurities remain in trap 34.

When the entire quantity of carbon dioxide produced by combustion of the given sample 21 has been transferred to cold trap 58, valves 83 and 39 are closed, valve 62 is opened, the liquid $N_2$ cryogen is removed, and the $CO_2$ in trap 58 is vaporized or distilled into the reactor ballast tank 63 through line 60 and valve 62. At this point valves 65, 55, 39, 83, 75, 102, 104, and 112 are closed. The pressure of the $CO_2$ in tank 63 is measured by meter 64. Sufficient hydrogen is then introduced from tank 45 into tank 63 for reaction with the $CO_2$ to produce methane. For this purpose, the hydrogen should be charged to the tank 63 in at least stoichiometric quantity; that is, the tank 63 should be charged with hydrogen until the final total pressure is at least 5 times the pressure of the $CO_2$ alone, since four moles of hydrogen are required to react with each mole of $CO_2$. It is noted that the hydrogen utilized for this purpose should be "dead" hydrogen, that is, it should not contain any tritium, because spurious radioactivity resulting from the presence of such isotopes would affect the subsequent measurement of the $C_{14}$.

To regulate or reduce the pressure drop across valve 65 and through converter 72, it is preferred that hydrogen also be charged through valve 55 into the reactor, before valve 65 is opened. The pressure of hydrogen so charged into the converter should be somewhat less than the total pressure in tank 63, e.g., about 40–100 p.s.i. This pressure prevents a sudden surge of flow as valve 65 is opened, improves the heat transfer in the reactor, and improves the reaction efficiency.

When the tank 63 has been charged with the $CO_2$ and $H_2$, valve 62 is closed, valve 55 is opened, and valve 65 is adjusted to establish a low rate of flow of the $CO_2$–$H_2$ mixture through the reactor 72. In this reactor 72 the carbon dioxide is converted quantitatively to methane. It is highly important that the conversion of the $CO_2$ to methane be quantitatively complete; if it is not, the $C_{14}/C_{12}$ ratio may be changed during the conversion thereby introducing error into the final age calculation. Preferably, the reactor 72 contains ruthenium catalyst which is heated by the heater 69 to a temperature of substantially 400–550° C., preferably 475° C. The water is captured in water removal zones 70 of the reactor 72, which are cooled in a Dewar flask not shown. Reference is hereby made to the disclosure of my previously identified application Serial No. 209,720 for a more complete description of the operation of the reactor 72.

From the reactor 72 the $CH_4$–excess $H_2$ mixture flows through line 56, valve 55, line 43, line 42, again into trap 58, and through line 59, valve 75, into trap 76. Valves 39, 62, and 83 are closed, and valves 77 and 86 remain open. Trap 58, which is now empty, is cooled with liquid nitrogen, and this liquid nitrogen freezes the major part, about 60% or more, of the methane passing through it, thereby separating that methane from excess hydrogen. Because of the low freezing point of methane, it is inconvenient to separate all of the $CH_4$ in a single trap at the existing flow velocity. The remainder of the methane flows into trap 76, which is also cooled with liquid nitrogen and which contains activated charcoal, and is absorbed on the charcoal in that trap at the low temperature present. The entire volume of the methane is thus separated in traps 58 and 76. Excess hydrogen is taken off by the vacuum pump through valve 77, line 78 and valve 86.

Depending on trap design, flow rates, and other factors, some hydrogen may be adsorbed on the activated charcoal in trap 76, or physically occluded by the frozen methane in trap 58. In addition, a trace quantity of unconverted $CO_2$ or unseparated water may be mixed with the $CH_4$ in trap 58. Such contaminants, if any, must be separated from the methane prior to counting. This can readily be done as follows: with valves 77, 83, 62, 55 and 39 closed, and with valve 75 open, the cryogen on trap 76 is removed, and as the trap warms, the methane in it slowly distills back into trap 58. The methane is frozen in trap 58, which is maintained at liquid $N_2$ temperature, but hydrogen from trap 76 is not occluded in trap 58, because of the low flow rate. Valve 77 is then opened and gaseous hydrogen is pumped off, trap 76 being heated if necessary to drive off all hydrogen previously adsorbed on the charcoal. Valve 75 is then closed and valve 62 is opened, and trap 58 is warmed to a temperature above the temperature of liquid nitrogen, but below the freezing point of carbon dioxide. Under these conditions, any remaining $CO_2$ and water remains solidified in trap 58, while the methane expands into tank 63, which has previously been evacuated. Trap 76 is recooled with liquid nitrogen, and valve 75 opened; the methane in tank 63 and the various interconnecting lines is adsorbed in trap 76, the $CO_2$ and water remaining in trap 58. Valves 75 and 62 are then closed, valve 83 opened, and trap 58 heated to expel the contaminants from it through line 82, including any hydrogen which had been trapped in that trap. When the contaminants have been removed to vacuum, which may be ascertained from the pressure in line 59 as measured by manometer 105, valve 83 is closed and valve 75 opened, trap 76 is warmed and trap 58 is cooled so that the purified methane in trap 76 is slowly distilled over into trap 58. This is done because it is more convenient to introduce the methane into the counter by vaporization rather than by deabsorption. If desired the $CH_4$ sample may be removed from the system through the sample outlet coupling 91, which is connected to a suitable container not shown. Otherwise, the sample in trap 58 is then expanded into the sample counter 95 through valve 102. Appropriate temperature and pressure measurements are made by manometer 105 and thermometer 117.

Measurement of the $C_{14}$ content of the sample may then be made in known manner, and from the $C_{14}/C_{12}$ ratio of the sample, its age determined.

OPERATION OF THE SYSTEM FOR MEASUREMENT OF LOW LEVEL TRITIUM

As previously explained, this system may be slightly modified for analysis of the tritium content of a hydrogen containing sample. Typically the sample will be water. If the volume of the aqueous sample is less than about 2 ml., it is vacuum distilled into a calcium oxide-zinc furnace for reduction to hydrogen. Aqueous samples having a volume greater than roughly 2 ml. are introduced into a boiler and heated to a steam pressure of approximately 200 p.s.i. This steam is then introduced into a magnesium furnace for reduction to hydrogen. In either case, the combustion tube 20 previously described is replaced with the hydrogen reduction unit. In the zinc furnace, the sample is reduced in accordance with the reaction,

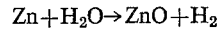

and in the magnesium furnace, the larger sample is reduced in accordance with the reaction,

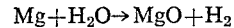

Following conversion of the sample to hydrogen, the gas is passed through the cold traps 32 and 34, cooled with liquid nitrogen, in which condensible and/or gaseous impurities are separated from the hydrogen-tritium mixture. The sample is then charged through trap 58 to the ballast tank 63 in the same manner that the $CO_2$ is charged to the tank in the method of analysing $C_{14}$ previously described.

The pressure of the hydrogen in tank 63 is measured by gauge 64, and the tank is charged with dead $CO_2$ in a quantity sufficient for conversion of most of the $H_2$ to $CH_4$. Atmospheric $CO_2$ is unsuitable for this purpose, inasmuch as it might contain $C_{14}$ which would affect the tritium count. Dead $CO_2$ may be obtained from the vacuum combustion of bituminous coal. Sufficient $CO_2$ is charged to the reactor through valve 62 so that the final pressure of the $CO_2$–$H_2$ gas mixture in the tank is slightly less than five fourths the pressure of the hydrogen in the tank.

The $H_2$–$CO_2$ mixture is then converted to methane in the reactor 72. However, in this case, the objective is to obtain as nearly a stoichiometric conversion as possible of the $H_2$. I have found that this is best accomplished if the reactor effluent consists of methane, water and a slight excess of $H_2$; if a slight excess of $CO_2$ is charged to tank 63, it is converted to carbon monoxide by the reactor 72, and an equal quantity of hydrogen is converted to water, which is undesirable not only from the standpoint of consuming hydrogen but also because CO is difficult to separate from $CH_4$. The purified $CH_4$ sample is transferred to the sample counter 95 for measurement of the tritium content.

While I have referred to Dry Ice and liquid $N_2$ as the cryogens which I prefer to use for cooling the traps, other equivalent coolants may be used to effect similar separations.

Having described my invention, what is claimed is:

1. The method of determining the $C_{14}$ content of a combustible carbon containing sample which comprises,
    burning said sample in excess oxygen in a closed system, contacting the products of air combustion with heated CuO, said CuO oxidizing any CO which is present in said products of combustion,
    passing said products of combustion through a filter comprising finely divided $MnO_2$ and granular silica gel, said filter thereby removing at least a part of the water vapor and nitrogen present in said products of combustion, absorbing substantially all sulfurous gases present and maintaining a positive pressure on said sample,
    separating remaining water vapor from said products of combustion by passing said products through a first cold trap cooled to a temperature below the freezing point of water but at which $CO_2$ does not solidify,
    separating the $CO_2$ from the major portion of excess $O_2$ in a second cold trap chilled to a temperature at which $CO_2$ solidifies but at which $O_2$ remains gaseous, distilling said $CO_2$ from said second cold trap into a third cold trap, said third trap being cooled with liquid $N_2$, drawing off remaining $O_2$ through a vacuum system, distilling said $CO_2$ from said third trap into a tank, admitting dead $H_2$ to said tank in sufficient quantity for complete conversion of said $CO_2$ in said tank to $CH_4$, quantitatively converting said $CO_2$ into $CH_4$ by passing said $CO_2$-$H_2$ mixture from said tank in contact with ruthenium at an elevated temperature, removing the water which is formed during said conversion, passing the $CH_4$ back to said third cold trap, said third trap being cooled with liquid $N_2$, a major portion of said $CH_4$ being retained in said third trap, passing the remainder of said $CH_4$ to a fourth cold trap, said fourth trap being cooled with liquid $N_2$ and containing activated charcoal, the remainder of said $CH_4$ being absorbed on said charcoal in said fourth trap, drawing off remaining $H_2$ through a vacuum system, and distilling the $CH_4$ from said third and fourth traps into a proportional counter for determination of the $C_{14}$ content of said $CH_4$.

2. The method of claim 1 wherein said filter holds a pressure of about 1 p.s.i. on said sample.

3. The method of claim 1 wherein said first trap is cooled with Dry Ice.

4. The method of claim 1 wherein said second trap is cooled with liquid $N_2$.

5. The method of claim 1 wherein said ruthenium comprises about 0.5% ruthenium metal deposited on an inert support and wherein said ruthenium is heated to a temperature of about 400–550° C.

6. The method of determining the $C_{14}$ content of a combustible carbon containing sample which comprises, burning said sample in excess oxygen in a closed system, passing the combustion gases through a first cold trap, said first cold trap being cooled with Dry Ice, water vapor in said combustion gases being retained in said first cold trap, flowing the remaining combustion gases through a second cold trap, said second cold trap being cooled with liquid $N_2$, $CO_2$ in said combustion gases being retained in said second trap, cooling said first trap with liquid $N_2$ and said second trap with Dry Ice, distilling said $CO_2$ from said second trap back into said first trap, sulfurous impurities remaining in said second trap, drawing off remaining oxygen, distilling said $CO_2$ from said first trap to a third cold trap, said third trap being cooled with liquid $N_2$, while maintaining said first trap below the freezing point of water, distilling said $CO_2$ from said third trap into a tank, charging dead $H_2$ to said tank in excess of the quantity necessary for complete conversion of said $CO_2$ to $CH_4$, quantitatively converting said $CO_2$ into $CH_4$ by passing the $CO_2$-$H_2$ mixture in contact with a ruthenium catalyst at a temperature of substantially 400–550° F.

removing the water which is formed during said conversion, passing the $CH_4$ back to said third cold trap, a major portion of said $CH_4$ being retained in said third trap, passing the remainder of said $CH_4$ to a fourth cold trap, said fourth cold trap being cooled with liquid $N_2$ and containing a gas absorptive medium, the remainder of said $CH_4$ being absorbed on said medium in said fourth trap, drawing off remaining $H_2$ through a vacuum system, and introducing said $CH_4$ into a proportional counter for determination of the $C_{14}$ content of said $CH_4$.

7. The method of claim 6 in which said $CO_2$ is distilled from said second trap to said first trap in the manner described, and wherein said $CO_2$ is then distilled back to said second trap and again back to said first trap to further purify said $CO_2$, before distilling said $CO_2$ from said first trap to said third trap.

8. The method of determining the $C_{14}$ content of a combustible carbon containing sample which comprises, burning said sample in excess oxygen in a closed system, contacting the products of said combustion with heated CuO, said CuO oxidizing any CO which is present in said products of combustion, passing said products of combustion through a filter comprising finely divided $MnO_2$ and granular silica gel, said filter thereby removing at least a part of the water vapor, sulfurous and nitrogenous gases present in said products of combustion and maintaining a positive pressure on said sample, separating remaining water vapor from said products of combustion by passing said products through a first cold trap, said first cold trap being cooled with Dry Ice, separating the $CO_2$ from the major portion of excess $O_2$ in a second cold trap, said second cold trap being cooled with liquid $N_2$, cooling said first trap with liquid $N_2$, said second trap and with Dry Ice, distilling said $CO_2$ from said second trap back into said first trap, sulfurous impurities remaining in said second trap.

drawing off remaining $O_2$, distilling said $CO_2$ from said first trap to a third cold trap, said third trap being cooled with liquid $N_2$, while maintaining said first trap below the freezing point of water, distilling said $CO_2$ from said third trap into a tank, admitting dead $H_2$ to said tank in sufficient quantity for complete conversion of said $CO_2$ to $CH_4$, converting said $CO_2$ into $CH_4$ by passing the $CO_2$-$H_2$ mixture from said tank in contact with ruthenium at an elevated temperature, removing the water which is formed during said conversion, passing the $CH_4$ back to said third cold trap, a major portion of said $CH_4$ being retained in said third trap, passing the remainder of said $CH_4$ to a fourth cold trap, said fourth cold trap being cooled with liquid $N_2$ and containing activated charcoal, the remainder of said $CH_4$ being absorbed on said charcoal in said fourth trap, drawing off remaining $H_2$ through a vacuum system, and introducing said $CH_4$ into a proportional counter for determination of the $C_{14}$ content of said $CH_4$.

9. In the process of measuring the $C_{14}$ content of a carbon containing sample, the purification technique which comprises, burning said sample in excess $O_2$ to change the carbon content of said sample to $CO_2$, passing said $CO_2$ through a first cold trap, said first trap being cooled to a temperature below the freezing point of water but at which $CO_2$ does not solidify, water admixed with said $CO_2$ thereby being retained in said first trap, solidifying said $CO_2$ in a second cold trap, said second cold trap being cooled with liquid $N_2$, said $CO_2$ thereby being separated from admixed $O_2$, drawing off gases which are not retained in said second trap, distilling said $CO_2$ into an evacuated chamber, admitting dead $H_2$ to said chamber in excess of the quantity required for complete conversion of said $CO_2$ to $CH_4$, converting said $CO_2$ into $CH_4$ by passing the $CO_2-H_2$ mixture in contact with a ruthenium catalyst at a temperature of substantially 400–550° F.

removing the water which is formed during conversion of said $CO_2$ into $CH_4$, passing the $CH_4$ product through a third cold trap, which is cooled with liquid nitrogen, a major portion of said $CH_4$ being retained in said third trap, passing the remainder of said $CH_4$ into a fourth cold trap, which is cooled with liquid nitrogen and which contains activated charcoal, the remainder of said $CH_4$ being absorbed on said charcoal in said fourth trap, and drawing off excess $H_2$ from said third and fourth traps.

10. The method of determining the $C_{14}$ content of a carbon containing sample which comprises, converting the carbon content of said sample to $CO_2$, purifying said $CO_2$ by removing water vapor, sulfurous gases, and nitrogenous gases which may be admixed with it, transferring said $CO_2$ into an evacuated chamber, admitting dead $H_2$ to said chamber in excess of the quantity required for complete conversion of said $CO_2$ to $CH_4$, converting said $CO_2$ into $CH_4$ by passing said $CO_2-H_2$ mixture in contact with a ruthenium catalyst at a temperature of substantially 400–550° F., removing the water which is formed during conversion of said $CO_2-H_2$ mixture to $CH_4$, flowing the $CH_4$-excess $H_2$ mixture into a first and a second trap in series, said first trap being cooled with liquid nitrogen, a major portion of said methane being retained in said first trap, said second trap being cooled with liquid nitrogen and containing activated charcoal, the remainder of said $CH_4$ being absorbed on said charcoal in said second trap, drawing off excess $H_2$, and distilling the $CH_4$ into a proportional counter for determination of the $C_{14}$ content of said $CH_4$.

11. The method of claim 10 wherein said $H_2$ is charged to said chamber in such quantity that the final pressure therein is at least five times the pressure of said $CO_2$ therein.

12. The method of claim 10 wherein said catalyst is maintained at a temperature of about 475° C. during said conversion of said $CO_2$-excess $H_2$.

13. The method of claim 10 wherein said ruthenium catalyst is pressurized with $H_2$ to a pressure less than the total pressure in said chamber, before said $CO_2-H_2$ mixture is passed in contact with said ruthenium catalyst.

14. The method of determining the $C_{14}$ content of a carbon containing sample which comprises, converting the carbon content of said sample to $CO_2$, purifying said $CO_2$ by removing water vapor, sulfurous gases, and nitrogenous gases which may be admixed with it, transferring said $CO_2$ into an evacuated chamber, admitting dead $H_2$ to said chamber in excess of the quantity required for complete conversion of said $CO_2$ to $CH_4$, converting said $CO_2$ into $CH_4$ by passing said $CO_2-H_2$ mixture in contact with a ruthenium catalyst at a temperature of substantially 400–550° F., removing the water which is formed during conversion of said $CO_2-H_2$ mixture to $CH_4$.

flowing the $CH_4$-excess $H_2$ mixture into a first and a second trap in series, said first trap being cooled with liquid nitrogen, a major portion of said methane being retained in said first trap, said second trap being cooled with liquid nitrogen and containing activated charcoal, the remainder of said $CH_4$ being absorbed on said charcoal in said second trap, warming said second trap to distill $CH_4$ therein back to said first trap, pumping off any $H_2$ from said second trap, warming said first trap to a temperature above the boiling point of $CH_4$ but below the freezing point of $CO_2$, and expanding said $CH_4$ back into said chamber, retrapping said $CH_4$ in said second trap at the temperature of liquid $N_2$, warming said first trap and drawing off impurities remaining therein, cooling said first trap with liquid $N_2$ and removing the liquid $N_2$ from said second trap, and redistilling said $CH_4$ to said first trap, and distilling the $CH_4$ from said first trap into a proportional counter for determinination of the $C_{14}$ content of said $CH_4$.

15. The method of determining the $C_{14}$ content of a combustible carbon containing sample comprising, burning said sample in excess $O_2$ in a closed system to convert said sample to $CO_2$, separating the water vapor produced by combustion of said sample, separating the $CO_2$ from excess oxygen by solidifying said $CO_2$ and drawing off excess $O_2$, thereafter warming said $CO_2$ to return it to the vapor state, admixing said $CO_2$ with dead hydrogen in excess of the amount required to convert all of said $CO_2$ to $CH_4$, reacting the $CO_2$ with said hydrogen to convert all of said $CO_2$ to $CH_4$ by passing the $CO_2-H_2$ mixture in contact with a ruthenium catalyst at a temperature of substantially 400–550° F.

flowing said $CH_4$-excess $H_2$ mixture into two cold traps in series, the first of said traps in series being cooled with liquid nitrogen, the major portion of said $CH_4$ being retained in the solid state in said first trap, the second of said traps being cooled with liquid nitrogen and containing activated charcoal, the remainder of said $CH_4$ being absorbed on said activated charcoal, drawing off excess $H_2$, and distilling the $CH_4$ into a sample counter.

16. Apparatus for the preparation of carbon containing samples for determination of the $C_{14}$ content thereof, said apparatus comprising, an elongated combustion chamber having an inlet and an outlet, means for admitting oxygen at a regulated flow rate into the inlet of said chamber, flow throttling means adjacent the outlet of said chamber, first, second and third cold traps connected in series to the outlet of said chamber, each said trap having an inlet and an outlet, a ballast tank connected to the outlet of said third trap, means for introducing dead hydrogen under pressure into said tank, a reactor for converting carbon dioxide to methane connected between said tank and the inlet of said third trap, a fourth cold trap connected to the outlet of said third trap, said fourth trap containing a gas absorbing medium, a sample counter connected to the outlet of said third trap, and a vacuum pump connected to the outlet of said fourth trap.

17. The apparatus of claim 16 including a by-pass line between the outlet of said third trap and said vacuum pump.

18. Apparatus for the preparation of gaseous samples for determination of the radioactive isotope content thereof, said apparatus comprising,
- a first, a second, and a third cold trap connected in series relation, each trap having an inlet and an outlet,
- a valve between said second and third traps,
- a ballast tank connected to the outlet of said third trap,
- a valve between said third trap and said tank,
- a reactor for converting carbon dioxide to methane connected between said tank and the inlet of said third trap,
- a valve between said tank and said reactor,
- a valve between said reactor and said third trap,
- a fourth cold trap connected to the outlet of said third trap, said fourth trap containing a gas absorbing medium,
- a valve between said third and fourth traps,
- a sample counter connected to the outlet of said third trap,
- and a source of vacuum connected to the outlet of said fourth trap.

19. Apparatus for the preparation of gaseous samples for determination of the radioactive isotope content thereof, said apparatus comprising,
- a first, a second and a third cold trap connected in series relation, each trap having an inlet and an outlet,
- a ballast tank connected to the outlet of said third trap,
- a reactor for converting carbon dioxide to methane connected between said tank and the inlet of said third trap,
- a fourth cold trap connected to the outlet of said third trap, said fourth trap containing a gas absorbing medium,
- and a sample counter connected to the outlet of said third trap.

References Cited by the Examiner
UNITED STATES PATENTS 1,515,237 11/1924 Yensen.
3,050,372 8/1962 Scott.

FOREIGN PATENTS 823,801 12/1951 Germany.

OTHER REFERENCES

Christman et al.: "Anal. Chem." 27 1935–1939 (1955).
Gaudin et al.: "Anal. Chem." 27 467 and 468 (1955).

MORRIS O. WOLK, *Primary Examiner.*

DELBERT E. GANTZ, *Examiner.*